(12) United States Patent
Kodemura et al.

(10) Patent No.: US 7,358,307 B2
(45) Date of Patent: Apr. 15, 2008

(54) GRAFTING-MODIFIED CYCLIC POLYMER, PROCESS FOR PRODUCING THE SAME, AND CURABLE COMPOSITION

(75) Inventors: Junji Kodemura, Kanagawa (JP); Kazuaki Kondo, Kanagawa (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/296,748

(22) PCT Filed: Apr. 27, 2001

(86) PCT No.: PCT/JP01/03708

§ 371 (c)(1), (2), (4) Date: May 30, 2003

(87) PCT Pub. No.: WO01/83576

PCT Pub. Date: Nov. 8, 2001

(65) Prior Publication Data

US 2003/0181580 A1 Sep. 25, 2003

(30) Foreign Application Priority Data

Apr. 28, 2000 (JP) .............................. 2000-131225

(51) Int. Cl.
*C08L 51/00* (2006.01)
(52) U.S. Cl. .................... 525/242; 525/284; 525/298
(58) Field of Classification Search ................ 525/242, 525/298, 284
See application file for complete search history.

(56) References Cited

U.S. PATENT DOCUMENTS

| 4,895,899 | A | * | 1/1990 | Wefer .......................... 525/67 |
| 5,206,303 | A | * | 4/1993 | Tse et al. ..................... 525/319 |
| 5,382,633 | A | * | 1/1995 | Scott et al. .................. 525/279 |
| 5,548,029 | A | * | 8/1996 | Powers et al. ............... 525/195 |
| 6,384,162 | B1 | * | 5/2002 | Zahalka et al. ............. 526/136 |
| 6,713,154 | B1 | * | 3/2004 | Tsunogae et al. ........... 428/131 |
| 2003/0181580 | A1 | * | 9/2003 | Kodemura et al. ........... 525/63 |
| 2005/0056377 | A1 | * | 3/2005 | Tominaga .................... 156/540 |
| 2006/0052535 | A1 | * | 3/2006 | Ajbani et al. ................. 525/88 |

FOREIGN PATENT DOCUMENTS

EP 936231 * 8/1999

* cited by examiner

*Primary Examiner*—Jeffrey Mullis
(74) *Attorney, Agent, or Firm*—Edwards Angell Palmer & Dodge LLP

(57) ABSTRACT

A graft polymer containing a cyclic structure comprised of a polymer containing a cyclic structure graft-modified with an unsaturated compound containing a polar group, having a graft ratio of 10 to 150 mol %, having a weight average molecular weight of 1,000 to 1,000,000, and having a gel content of not more than 0.1 wt % or having a ratio (Ha/La) of high molecular weight side area (Ha) and low molecular weight side area (La) divided by a vertical line suspended from a peak top of a differentiated elution profile measured by gel permeation chromatography to a baseline of not more than 1.6, a method of production of the same, and a curable composition containing that graft polymer containing a cyclic structure and a curing agent.

10 Claims, No Drawings

GRAFTING-MODIFIED CYCLIC POLYMER, PROCESS FOR PRODUCING THE SAME, AND CURABLE COMPOSITION

TECHNICAL FIELD OF THE INVENTION

The present invention relates to a graft polymer containing a cyclic structure, a method of production of the same, and a curable composition containing that graft polymer. More particularly, it relates to a graft polymer containing a cyclic structure having a high graft ratio, having a good filterability of solution when dissolved in a solvent, superior in surface hardness of a coating obtained by coating that solution, superior in smoothness and flatness of a coating on a micro-circuit board, and having a good heat resistance, a method of production of the same, and a curable composition containing that graft polymer.

BACKGROUND ART

Along with the increasingly smaller sizes and greater number of functions of electronic equipment, greater density of the circuit boards used in the electronic equipment is also being sought. The general method for increasing the density of circuit boards is to make the interconnections finer, that is, reduce the line widths. As insulation materials used for this purpose, curable compositions superior in low dielectric property, low water absorption, and heat resistance are being sought. For example, International Publication WO98/56011 discloses the following curable composition. This curable composition is obtained by filtering a graft polymer containing a cyclic structure by a filter of a pore size of 0.22 μm, then dissolving or dispersing it in an organic solvent together with a curing agent. The graft polymer containing a cyclic structure is produced by graft modifying a norbornene-based polymer or other polymer containing a cyclic structure in xylene or another hydrocarbon-based solvent in the presence of a large amount of peroxide by maleic anhydride or another unsaturated compound by 2.5 mol %.

On the other hand, in applications of electronic equipment, there has been a sharp increase in fields where a high heat resistance is sought in the insulating materials as well and fields where surface hardness for multilayer structures are sought. To deal with this, in the curable composition described in the above international publication, a graft polymer containing a cyclic structure having a high graft ratio has to be used. The graft polymer containing a cyclic structure of the high graft ratio described in that international publication improves the heat resistance and the surface hardness, but has a large gel content, so the solution of the polymer dissolved in a solvent cannot be filtered. Therefore, the coating film has the defects of insufficient smoothness and flatness.

DISCLOSURE OF INVENTION

An object of the present invention is to provide a graft polymer containing a cyclic structure having a high graft ratio, having a good filterability of solution when dissolved in a solvent, and giving a coating film when coating the solution which is good in smoothness, flatness, surface hardness, etc. and superior in low dielectric property, low water absorption, and heat resistance.

Another object of the present invention is to provide a method of production of this graft polymer containing a cyclic structure.

A still other object of the present invention is to provide a curable composition including this graft polymer containing a cyclic structure.

The present inventors discovered that a coating film obtained by curing by a curing agent a graft polymer containing a cyclic structure having a high graft ratio and low gel content or small high molecular weight ingredients can be improved in the surface hardness or heat resistance without impairing the low dielectric rate or low water absorption and when formed on a micro-circuit board is superior in smoothness and flatness as well.

Further, the present inventors discovered that by using as a reaction solvent a mixed solvent of a nonpolar organic solvent and polar organic solvent, a graft polymer containing a cyclic structure having the above characteristics can be easily obtained and further that if gradually adding a peroxide, production of high molecular weight ingredients can be more effectively suppressed.

Further, the present inventors discovered that if employing the method of production comprising dissolving the polymer containing a cyclic structure in an organic solvent and in that state gradually adding a peroxide and unsaturated organic compound containing a polar group, the graft polymer containing a cyclic structure obtained will not be colored much and little agglomerates will be formed.

The present invention was perfected based on these discoveries.

According to the present invention, there is provided a graft polymer containing a cyclic structure comprised of a polymer containing a cyclic structure graft-modified with an unsaturated compound containing a polar group, having a graft ratio of 10 to 150 mol %, having a gel content of not more than 0.1 wt %, and having a weight average molecular weight (Mw) of 1,000 to 1,000,000.

Further, according to the present invention, there is provided a graft polymer containing a cyclic structure comprised of a polymer containing a cyclic structure graft-modified with an unsaturated compound containing a polar group, having a graft ratio of 10 to 150 mol %, having a ratio (Ha/La) of a high molecular weight side area (Ha) and a low molecular weight side area (La) divided by a vertical line suspended from a peak top of a differentiated elution profile measured by gel permeation chromatography to a baseline of not more than 1.6, and having an Mw of 1,000 to 1,000,000.

Further, according to the present invention, there is provided a method of production of a graft polymer containing a cyclic structure comprising dissolving a polymer containing a cyclic structure and unsaturated compound containing a polar group in a mixed solvent of a nonpolar organic solvent and a polar organic solvent and in that state causing a graft reaction of the unsaturated compound containing a polar group with the polymer containing a cyclic structure in the presence of a peroxide.

Further, according to the present invention, there is provided a method of production of a graft polymer containing a cyclic structure comprising dissolving a polymer containing a cyclic structure and unsaturated compound containing a polar group in a mixed solvent of a nonpolar organic solvent and a polar organic solvent and in that state causing a graft reaction of the unsaturated compound containing a polar group while continuously or intermittently adding a peroxide.

Further, according to the present invention, there is provided a method of production of a graft polymer containing a cyclic structure comprising dissolving a polymer containing a cyclic structure in an organic solvent and in that state causing a graft reaction of an unsaturated compound containing a polar group with the polymer containing a cyclic structure while continuously or intermittently adding a peroxide and the unsaturated compound containing a polar group.

Further, according to the present invention, there is provided a curable composition containing the above graft polymer containing a cyclic structure and a curing agent.

The curable composition containing the graft polymer containing a cyclic structure of the present invention is good in filterability and gives a coating film superior in smoothness, flatness, surface hardness, etc. and good in low dielectric property, low water absorption, and heat resistance. Therefore, in the form of a film or sheet, it is used for an insulating material for a printed writing board, an insulating material film between layers for a semiconductor device, a protective coating material for a semiconductor device, a solder resist material for a printed writing board, a color filter for a liquid crystal display substrate, a flattening film for various interconnections, cells for a liquid crystal display, etc.

BEST MODE FOR CARRYING OUT THE INVENTION

Graft Polymer Containing a Cyclic Structure

The graft polymer containing a cyclic structure of the present invention is comprised of a polymer containing a cyclic structure graft-modified by an unsaturated compound containing a polar group and is characterized by a high graft ratio and low gel content.

(A) Polymer Containing a Cyclic Structure

A polymer containing a cyclic structure is a homopolymer or a copolymer having repeating units having a cyclic structure at its main chain and/or side chain. From the viewpoint of the heat resistance, solvent resistance, etc., it preferably contains a cyclic structure at its main chain. As the cyclic structure, for example, an aromatic cyclic structure, saturated cyclic hydrocarbon (cycloalkane) structure, unsaturated cyclic hydrocarbon (cycloalkene) structure, etc. may be mentioned, but from the viewpoint of the low dielectric property, low water absorption, transparency, heat resistance, and surface hardness, a cycloalkane structure is preferable. Further, as a cyclic structure, a monocyclic or polycyclic structure (condensation polycyclic structure, cross-linking cyclic structure, combination polycyclic structures of the same, etc.) may be mentioned. The number of carbon atoms forming the cyclic structure is not particularly limited, but usually is 4 to 30, preferably 5 to 20, more preferably 5 to 15. If in this range, the various properties of the heat resistance, surface hardness, and shapeability are balanced to a high degree and suitable.

The ratio of the repeating units containing cyclic structures in the polymer containing a cyclic structure is suitably selected in accordance with the object of use, but normally is 30 to 100 wt %, preferably 50 to 100 wt %, more preferably 70 to 100 wt %. If the ratio of the repeating units containing cyclic structures in the polymer containing a cyclic structure is excessively small, the polymer is poor in dielectric property, water absorption, heat resistance, and surface hardness and therefore not preferable. The rest of the polymer containing a cyclic structure other than the repeating units containing cyclic structures is not particularly limited and may be suitably selected in accordance with the object of use.

As specific examples of the polymer having a cyclic structure, (1) a norbornene-based polymer, (2) monocyclic olefin-based polymer, (3) cyclic conjugated diene-based polymer, (4) vinyl-based cyclic hydrocarbon-based polymer, (5) aromatic polymer having repeating units of aromatic rings in its main chain, (6) hydrides of the same, etc. may be mentioned. Among these, a norbornene-based polymer and its hydrides, cyclic conjugated diene-based polymer and its hydrides, etc. are preferable. A norbornene-based polymer and its hydrides are particularly preferable.

(1) Norbornene-Based Polymer

The norbornene-based polymer is not particularly limited. For example, ones obtaining by polymerizing norbornene-based monomers by the method disclosed in Japanese Unexamined Patent Publication (Kokai) No. 3-14882, Japanese Unexamined Patent Publication (Kokai) No. 3-122137, etc. may be mentioned. Specifically, ring-opening polymers of norbornene-based monomers and their hydrides, addition polymers of norbornene-based monomers, addition copolymers of norbornene-based monomers and vinyl compounds, etc. may be mentioned. Among these, from the viewpoint of obtaining a graft unsaturated organic compound having a high graft ratio and low gel content, a ring-opening polymer hydride of a norbornene-based monomer, an addition polymer of a norbornene-based monomer, or an addition copolymer of a norbornene-based monomer and copolymerizable vinyl compound is preferable. A ring-opening polymer hydride of a norbornene-based monomer is particularly preferable.

As specific examples of the norbornene-based monomer, bicyclo[2,2,1]-hept-2-ene (common name: norbornene), 5-methyl-bicyclo[2,2,1]-hept-2-ene, 5,5-dimethyl-bicyclo[2,2,1]-hept-2-ene, 5-ethyl-bicyclo[2,2,1]-hept-2-ene, 5-butyl-bicyclo[2,2,1]-hept-2-ene, 5-hexyl-bicyclo[2,2,1]-hept-2-ene, 5-octyl-bicyclo[2,2,1]-hept-2-ene, 5-octadecyl-bicyclo[2,2,1]-hept-2-ene, 5-ethylidene-bicyclo[2,2,1]-hept-2-ene, 5-methylidene-bicyclo[2,2,1]-hept-2-ene, 5-vinyl-bicyclo[2,2,1]-hept-2-ene, 5-propenyl-bicyclo[2,2,1]-hept-2-ene, tricyclo[4,3,0,1$^{2,5}$]-deca-3,7-diene (common name "dicyclopentadiene"), tricyclo[4,4,0,1$^{2,5}$]-undeca-3,8-diene, tricyclo[4,4,0,1$^{2,5}$]-undec-3-ene, 5-cyclopentyl-bicyclo[2,2,1]-hept-2-ene, 5-cyclohexyl-bicyclo[2,2,1]-hept-2-ene, 5-cyclohexenyl-bicyclo[2,2,1]-hept-2-ene, 5-phenyl-bicyclo[2,2,1]-hep t-2-ene, tetracyclo[4,4,0,1$^{2,5}$,1$^{7,10}$]-dodeca-3-ene (sometimes simply called "tetracyclododecene), 8-methyl-tetracyclo[4,4,0,1$^{2,5}$,1$^{7,10}$]-dodeca-3-ene, 8-ethyl-tetracyclo[4,4,0,1$^{2,5}$,1$^{7,10}$]-dodeca-3-ene, 8-methylidene-tetracyclo[4,4,0,1$^{2,5}$,1$^{7,10}$]-dodeca-3-ene, 8-ethylidene-tetracyclo[4,4,0,1$^{2,5}$,1$^{7,10}$]-dodeca-3-ene, 8-vinyl-tetracyclo[4,4,0,1$^{2,5}$,1$^{7,10}$]-dodeca-3-ene, 8-propenyl-tetracyclo[4,4,0,1$^{2,5}$,1$^{7,10}$]-dodeca-3-ene, 8-cyclopentyl-tetracyclo[4,4,0,1$^{2,5}$,1$^{7,10}$]-dodeca-3-ene, 8-cyclohexyl-tetracyclo[4,4,0,1$^{2,5}$,1$^{7,10}$]-dodeca-3-ene, 8-cyclohexenyl-tetracyclo[4,4,0,1$^{2,5}$,1$^{7,10}$]-dodeca-3-ene, 8-phenyl-cyclopentyl-tetracyclo[4,4,0,1$^{2,5}$,1$^{7,10}$]-dodeca-3-ene;

tetracyclo[7,4,0,1$^{10,13}$,0$^{2,7}$]trideca-2,4,6,11-tetraene (also called "1,4-methano-1,4,4a,9a-tetrahydrofluorene"), tetracyclo[8,4,0,1$^{11,14}$,0$^{3,8}$]trideca-3,5,7,12-tetraene (also called "1,4-methano-1,4,4a,5,10,10a-hexahydroanthracene"), pentacyclo[6,5,1$^{3,6}$,0$^{2,7}$,0$^{9,13}$]pentadeca-3,10-diene; pentacyclo[7,4,0,1$^{3,6}$,1$^{10,13}$,0$^{2,7}$]pentadeca-4,11-diene, addition products of at least tetramers of cyclopentadiene, 5-phenylbicyclo[2,2,1]-hept-2-ene, tetracyclo[6,5,0,1$^{2,5}$0$^{8,13}$]trideca-3,8,10,12-tetraene (also called "1,4-methano-1,4,4a,9a-tetrahydrofluoren"), tetracyclo[6,6,0,1$^{2,5}$,0$^{8,13}$]tetradeca-3,8,10,12-tetraene (also called "1,4-methano-1,4,4a,5,10,10a-hexahydroanthracene"), and other norbornene-based monomers not having a polar group;

5-methoxycarbonyl-bicyclo[2,2,1]-hept-2-ene, 5-methyl-5-methoxycarbonyl-bicyclo[2,2,1]-hept-2-ene, 5-ethoxycarbonyl-bicyclo[2,2,1]-hept-2-ene, 5-methyl-5-ethoxycarbonyl-bicyclo[2,2,1]-hept-2-ene, bicyclo[2,2,1]-hept-5-enyl-2-methylpropionate, bicyclo[2,2,1]-hept-5-enyl-2-methyloctanate, bicyclo[2,2,1]-hept-2-en-5,6-dicarboxylic anhydride, 5-hydroxymethyl-bicyclo[2,2,1]-hept-2-ene, 5,6-di(hydroxymethyl)bicyclo[2,2,1]-hept-2-ene, 5-hydroxy-i-propyl-bicyclo[2,2,1]-hept-2-ene, 5,6-dicarboxy-bicyclo[2,2,1]-hept-2-ene; 5-cyanobicyclo[2,2,1]-hept-2-ene, bicyclo[2,2,1]-hept-2-en-5,6-dicarboxylateimide, 8-methoxycarbonyl-tetracyclo[4,4,0,1$^{2,5}$,1$^{7,10}$]-dodeca-3-ene, 8-methyl-8-methoxycarbonyl-tetracyclo [4,4,0,1$^{2,5}$, 1$^{7,10}$]-dodeca-3-ene, 8-hydroxymethyl-tetracyclo[4,4,0,1$^{2,5}$, 1$^{7,10}$]-dodeca-3-ene, 8-carboxy-tetracyclo[4,4,0,1$^{2,5}$,1$^{7,10}$]-dodeca-3-ene, and other norbornene-based monomers having polar groups etc. may be mentioned. Among these norbornene-based monomers, norbornene-based monomers not having polar groups are suitable since the polymers obtained using the same give a superior low dielectric property, low water absorption, and transparency.

These norbornene-based monomers may be used alone or in combinations of two or more types. The norbornene-based polymer may also be a copolymer between a norbornene-based monomer and another monomer able to be copolymerized with this (hereinafter called a "comonomer"). The ratio of the norbornene-based monomer bonds in the norbornene-based polymer is suitably selected in accordance with the object of use, but normally is at least 30 wt %, preferably at least 50%, more preferably at least 70 wt %. Such a one is very well balanced in low dielectric property, low water absorption, heat resistance, and surface hardness.

As comonomers of the above norbornene-based monomers, ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicocene, and other $C_2$ to $C_{20}$ ethylenes or α-olefins; cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, and other cycloolefins; 1,4-hexadiene, 4-methyl-1,4-hexadiene, 5-methyl-1,4-hexadiene, 1,7-octadiene, and other unconjugated dienes, etc. may be mentioned. These may be used alone or in combinations of two or more types.

The method of polymerization and method of hydrogenation of the norbornene-based monomer or norbornene-based monomer and comonomer are not particularly limited. Known methods may be followed.

A ring-opening (co)polymer of a norbornene-based monomer can be obtained using as the ring-opening polymerization catalyst a catalyst system comprised of a halide, nitrate, or acetylacetone compound of a metal such as ruthenium, rhodium, palladium, osmium, iridium, and platinum or a catalyst system comprised of a halide or acetylacetone compound of a metal such as titanium, vanadium, zirconium, tungsten, and molybdenum and an organoaluminum compound in a solvent or not in a solvent to cause ring-opening (co)polymerization normally at a polymerization temperature of −50° C. to 100° C. and a polymerization pressure of 0 to 50 kg/cm$^2$. It is possible to add to the catalyst system molecular oxygen, an alcohol, ether, peroxide, carboxylic acid, acid anhydride, acid chloride, ester, ketone, nitrogen-containing compound, sulfur-containing compound, halogen-containing compound, molecular iodine, and other Lewis acids and other tertiary ingredients to raise the polymerization activity and the ring-opening polymerization selectivity.

An addition type copolymer of a norbornene-based monomer and copolymer can for example be obtained by the method of for example copolymerizing the monomer ingredients in a solvent or not in a solvent in the presence of a catalyst system comprised of a vanadium compound and an organoaluminum compound normally at a polymerization temperature of −50° C. to 100° C. and a polymerization pressure of 0 to 50 kg/cm$^2$.

A hydrogenated norbornene-based polymer may be obtained by the method of hydrogenating a ring-opening (co)polymer by an ordinary method by hydrogen in the presence of a hydrogenation catalyst. Due to the hydrogenation, the carbon-carbon unsaturated bonds present in the main chain or side chain are partially or fully hydrogenated and saturated. In the case of a norbornene-based polymer containing an aromatic ring, the aromatic ring may be hydrogenated by hydrogenation or only the non-aromatic carbon-carbon unsaturated bonds of the main chain and side chain may be selectively hydrogenated.

(2) Monocyclic Olefin-Based Polymer

As the monocyclic olefin-based polymer, for example, the ones disclosed in Japanese Unexamined Patent Publication (Kokai) No. 64-66216, that is, addition homo polymers or copolymers of cyclohexene, cycloheptene, cyclooctene, and other monocyclic olefin-based monomers or copolymers of these mono cyclic olefin-based monomers and similar comonomers as the case of said norbornene-based monomer polymers may be used.

(3) Cyclic Conjugated Diene-Based Polymer

As the cyclic conjugated diene-based polymer, for example, the ones disclosed in Japanese Unexamined Patent Publication (Kokai) No. 6-136057 or Japanese Unexamined Patent Publication (Kokai) No. 7-258318, that is, (co)polymers obtained by 1,2- or 1,4-addition polymerization of cyclopentadiene, cyclohexadiene, and other cyclic conjugated diene-based monomers and hydrides of the same etc. may be used.

(4) Vinyl-Based Cyclic Hydrocarbon-Based Polymer

As the vinyl-based cyclic hydrocarbon-based polymer, for example, the ones disclosed in Japanese Unexamined Patent Publication (Kokai) No. 51-59989, that is homo polymers or copolymers of vinylcyclohexene, vinylcyclohexane, and other vinyl-based cyclic hydrocarbon-based monomers or hydrides of the same may be used. Said copolymers include copolymers of vinylcyclohexene or vinylcyclohexane and comonomers similar to the case of the above norbornene-based monomer polymers. Further, those disclosed in Japanese Unexamined Patent Publication (Kokai) No. 63-43910, Japanese Unexamined Patent Publication (Kokai) No. 64-1706, etc., that is, styrene, α-methylstyrene, or other vinyl aromatic monomers or copolymers of vinyl aromatic monomers and monomers able to be copolymerized by the same or hydrides of the same etc. may be used.

(5) Aromatic Polymer Having Repeating Units of Aromatic Rings at Main Chain

As an aromatic polymer having repeating units of aromatic rings in its main chain, for example, polyphenylene sulfide, polyphenylene ether, polyether sulfone, polysulfone, etc. may be used.

(B) Unsaturated Organic Compound Containing Polar Group

The unsaturated compound containing a polar group is not particularly limited so long as it is an organic compound containing a polar group and containing radical reactive carbon-carbon unsaturated bonds.

As the polar group, for example, a hetero atom or an atomic group having a hetero atom may be mentioned. As a hetero atom, for example, an oxygen atom, nitrogen atom, sulfur atom, silicon atom, halogen atom, etc. may be mentioned, but from the viewpoint of the low dielectric property, low water absorption, and transparency, an oxygen atom and nitrogen atom are preferable. As specific examples of the polar group, an epoxy group, carboxyl group, hydroxyl group, oxy group, ester group, carbonyloxycarbonyl group, silanol group, silyl group, amino group, nitrile group, sulfone group, etc. may be mentioned. Among these, in terms of the low dielectric property, low water absorption, transparency, and graft ratio, an epoxy group, hydroxyl group, ester group, silanol group, carbonyloxycarbonyl group, etc. are preferable, an epoxy group and carbonyloxycarbonyl group are more preferable, and a carbonyloxycarbonyl group is particularly preferable.

As the carbon-carbon unsaturated compound containing a polar group, glycidyl acrylate, glycidyl methacrylate, endo-cis-bicyclo[2,2,1]-hept-5-ene-2,3-d icarboxylic acid, endo-cis-bicyclo[2,2,1]-hept-5-ene-2-methyl-2,3-dicarboxylic acid, allyl glycidyl ether, 2-methyl allyl glycidyl ether, a glycidyl ether of o-allyl phenol, a glycidyl ether of m-allyl phenol, a glycidyl ether of p-allyl phenol, and other unsaturated epoxy compounds; acrylic acid, methacrylic acid, α-ethylacrylic acid, maleic acid, fumaric acid, itaconic acid, endocis-bicyclo[2,2,1]-hept-5-ene-2,3-d icarboxylic acid, methyl-endocis-bicyclo[2,2,1]-hept-5-end-2,3-dicarboxylic acid, and other unsaturated carboxylic acid compounds; maleic anhydride, chloromaleic anhydride, butenyl succinic anhydride, tetrahydrophthalic anhydride, citraconic anhydride, and other unsaturated carboxylic anhydride compounds;

monomethyl maleate, dimethyl maleate, glycidyl maleate, and other unsaturated ester compounds; allyl alcohol, 2-allyl-6-methoxyphenol, 4-allyloxy-2-hydroxybenzophenone, 3-allyloxy-1,2-propanediol, 2-allylphenol, 3-buten-1-ol, 4-penten-1-ol, 5-hexen-1-ol, and other unsaturated alcohol compounds; chlorodimethylvinylsilane, trimethylsilylacetylene, 5-trimethylsilyl-1,3-cyclopentadiene, 3-trimethylsilyllallyl alcohol, trimethylsilyl methacrylate, 1-trimethylsiloxy-1,3-butadiene, 1-trimethylsiloxy-cyclopentene, 2-trimethylsiloxyethyl methacrylate, 2-trimethylsiloxyfuran, 2-trimethylsiloxypropene, allyloxy-t-butyldimethylsilane, allyloxytrimethylsilane, and other unsaturated silane compounds etc. may be mentioned. Among these, unsaturated epoxy compounds or unsaturated carboxylic anhydride compounds are preferable. In particular, unsaturated carboxylic anhydride compounds are preferable.

(C) Graft Polymer Containing a Cyclic Structure

The graft ratio x of the graft polymer containing a cyclic structure of the present invention (if 1, meaning 100 mol %) is calculated by the following formula based on $^1$H-NMR measurement:

$(D-x)/(C \cdot x) = B/A$ where, A is the sum of the peak areas of the hydrogen derived from the unsaturated compound containing a polar group and B is the sum of the peak areas of the hydrogen derived from the polymer containing a cyclic structure in the graft polymer containing a cyclic structure.

C is the number of hydrogen atoms in one molecule of the modified compound when the unsaturated compound having a polar group is modified with the polymer and, for example, for maleic anhydride, is 3.

D is the number of hydrogen atoms of one unit of the structural monomer of the polymer containing a cyclic structure and, in the case of a polymer obtained by ring-opening polymerization and hydrogenation of ethyl tetracyclododecene, is 22. In the case of a copolymer, this is calculated as the weighted average for the structural monomers.

The graft ratio is, based on the total number of monomer units in the polymer, not lower than 10 mol %, preferably 30 mol %, more preferably 40 mol %. On the other hand, it is not more than 150 mol %, preferably 120 mol %, more preferably 100 mol %. If the graft ratio is excessively low, the graft polymer containing a cyclic structure falls in heat resistance or surface hardness or becomes low in polarity and poorer in dispersion of the curing agent, so is liable to become poor in low water absorption, low dielectric property, and transparency. Conversely, if excessively high, it tends to deteriorate in the low dielectric property and low water absorption.

The molecular weight of the graft polymer containing a cyclic structure of the present invention is, in terms of the weight average molecular weight (Mw) converted to polystyrene measured by gel permeation chromatography (GPC) using toluene or tetrahydrofuran (THF) as a solvent, 1,000 to 1,000,000, preferably 5,000 to 500,000, more preferably 10,000 to 250,000. If the Mw of the graft polymer containing a cyclic structure is excessively small, the polymer is inferior in solvent resistance or heat resistance, while conversely if excessively large, is inferior in dispersion of the curing agent and tends to fall in each of the characteristics of the low dielectric property, low water absorption, transparency, heat resistance, solvent resistance, and surface hardness.

The ratio (Ha/La) of the high molecular weight side area (Ha) and low molecular weight side area (La) divided by a vertical line suspended from a peak top of a differentiated elution profile measured by GPC using toluene or THF as a solvent to a baseline is normally not more than 1.6, preferably not more than 1.4, with respect to the graft polymer containing a cyclic structure of the present invention. If the value of Ha/La is in this range, the coating film is superior in smoothness, flatness, interconnection buriability, and other properties and therefore is preferable.

The gel content of the graft polymer containing a cyclic structure of the present invention is obtained by filtering a 10 wt % THF solution by a Teflon filter of a pore size of 0.22 μm, then recovering the undissolved polymer remaining on the filter, vacuum drying it at a temperature of 120° C. for 12 hours, then measuring the weight, and is expressed as a ratio (wt %) in the weight of the graft polymer containing a cyclic structure before filtration. In the graft polymer containing a cyclic structure, the value of the gel content is not more than 0.1 wt %, preferably not more than 0.05 wt %, more preferably not more than 0.01 wt %. If the gel content of the graft polymer containing a cyclic structure is excessively high, the removal of the gel by the filter is difficult and the coating film prepared by the obtained curable composition is inferior in flatness and smoothness, so this is not preferable.

(D) Graft Reaction

The first method for obtaining the graft polymer containing a cyclic structure of the present invention is to dissolve the polymer containing a cyclic structure and unsaturated compound containing a polar group in a mixed solvent of a nonpolar organic solvent and polar organic solvent and cause a graft reaction of the unsaturated compound containing a polar group with the polymer containing a cyclic structure in the presence of a peroxide. The type of the reaction may be to add the polymer containing a cyclic structure, the unsaturated compound containing a polar group, and the peroxide all together to the mixed solvent of the nonpolar organic solvent and polar organic solvent or to dissolve the polymer containing a cyclic structure and unsaturated compound containing a polar group in the mixed solvent and in that state adding the peroxide continuously or intermittently to cause the reaction.

The second method of obtaining the graft polymer containing a cyclic structure of the present invention is to dissolve the polymer containing a cyclic structure in an organic solvent and gradually add the unsaturated compound containing a polar group and peroxide continuously or intermittently to cause a graft reaction. In the second method of production, the organic solvent for dissolving the polymer containing a cyclic structure may be either a nonpolar organic solvent or polar organic solvent, but a mixed solvent of these is preferable. The unsaturated compound containing a polar group and peroxide may be added separately or mixed. The unsaturated compound containing a polar group or peroxide may be added dissolved in an organic solvent. The first method of production and the second method of production have the advantages of small coloring of the graft polymer containing a cyclic structure obtained, little agglomeration, and a narrow distribution of molecular weight, but the second method of production is preferable in that it is more superior in these.

The nonpolar organic solvent is not particularly limited so long as it can dissolve a polymer containing a cyclic structure. For example, toluene, xylene, ethylbenzene, t-butylbenzene, and other aromatic hydrocarbons; n-pentane, hexane, heptane, and other aliphatic hydrocarbons; cyclopentane, cyclohexane, and other alicyclic hydrocarbons, etc. may be mentioned. Aromatic hydrocarbons or alicyclic hydrocarbons are particularly preferable. These nonpolar organic solvents may be used alone or in combinations of two or more types.

The polar organic solvent is not particularly limited, but a polar organic solvent not having active hydrogen is usually used. As a polar organic solvent not having active hydrogen, chlorobenzene, dichlorobenzene, trichlorobenzene, and other halogenated hydrocarbons; acetone, methylethylketone, methyisobutylketone, cyclohexanone, benzophenone, and other ketones; diethylether, tetrahydrofuran, anisole, and other ethers; N-methylpyrrolidone, N-ethylpyrrolidone, N-phenylpyrrolidone, N-benzylpyrrolidone, N,N-dimethylformamide, and other amide compounds; methyl formate, ethyl formate, methyl acetate, ethyl acetate, propyl acetate, methyl propionate, ethyl propionate, propyl propionate, methyl butyrate, ethyl butyrate, ethyl lactate, dimethyl carbonate, dimethyl phthalate, diethyl phthalate, γ-butyl lactone, and other esters; acetonitrile, propionitrile, butyronitrile, benzonitrile, captonitrile, and other nitrile compounds; dimethyl sulfoxide and other sulfoxide compounds, etc. may be mentioned. Among theses, ketones, ethers, esters, etc. are preferable. These polar organic solvents may be used alone or in combinations of two or more types. The polar organic solvent may be mixed with the hydrocarbon-based solvent at the initial stage of the graft reaction or added during the middle of the reaction. If a nonpolar organic solvent and polar organic solvent are used together as the solvent for the graft reaction, the graft ratio can be raised and the gel content of the polymer can be reduced.

The ratio of the nonpolar organic solvent and polar organic solvent in the mixed solvent is suitably selected according to the type of the solvents, but in terms of the weight ratio of the polar organic solvent to the nonpolar organic solvent, normally is 95:5 to 5:95, preferably 90:10 to 15:85, more preferably 85:15 to 30:70, most preferably 85:15 to 40:60. When the ratio of the nonpolar organic solvent and polar organic solvent is in this range, a graft polymer having a high graft ratio and low gel content or low Ha/La ratio is easily obtained and suitable. The Ha/La ratio is sufficiently in this range at the time of end of the graft reaction. It is also possible to use only the nonpolar organic solvent before the start of the reaction and increase the polar organic solvent along with the trends in the graft reaction to obtain the above ratio range.

The amount of the mixed solvent used is suitably selected in accordance with the reaction conditions etc., but, with respect to 100 parts by weight of the polymer containing a cyclic structure, is normally 50 to 5,000 parts by weight, preferably 70 to 3,000 parts by weight, more preferably 100 to 1,000 parts by weight.

The peroxide is not particularly limited. Specifically, benzoyl peroxide, dichlorobenzoyl peroxide, dicumyl peroxide, di-tert-butyl peroxide, 2,5-dimethyl-2,5-di(peroxidebenzoate)hexyl-3,1,4-bis(tert-butylperoxyisopropyl)benzene, lauroyl peroxide, tert-butylperacetate, tert-butylperisobutyrate, tert-butylper-sec-octoate, tert-butylperpivalate, cumylperpivalate, tert-butylperdiethyl acetate, etc. may be mentioned.

These peroxides may be used alone or in combinations of two or more types. The amount of the peroxide used may be suitably selected in accordance with the graft ratio and reaction conditions etc., but, with respect to 100 parts by weight of the unsaturated organic compound, is normally 1 to 50 parts by weight, preferably 1.5 to 40 parts by weight, more preferably 2 to 30 parts by weight. If the amount of use of the peroxide is excessively small, the graft ratio will not rise. Conversely, if excessively small, gelation progresses. Neither is preferable.

The method of addition of the peroxide or unsaturated compound containing a polar group to the reaction system is not particularly limited. It may be added all together or gradually added by intermittent or continuous addition. The amount of gradual addition of the peroxide or unsaturated compound containing a polar group is normally at least ½ of the total amount, preferably at least ⅔, more preferably at least ¾. If the amount of gradual addition becomes greater, the high molecular weight/low molecular weight area ratio of the graft polymer becomes smaller (high molecular weight ingredients become smaller) and the filterability of the solution or the flatness, smoothness, buriability, etc. of the coating film become more superior, so this is preferable.

The reaction temperature of the graft modification is normally 0 to 400° C., preferably 30 to 350° C., more preferably 60 to 200° C., while the reaction temperature is normally 1 minute to 24 hours, preferably 30 minutes to 10 hours. After the end of the graft reaction, it is possible to separate the graft polymer containing a cyclic structure by an ordinary method. For example, it is possible to obtain it by adding drop-wise the reaction solution to a poor solvent to cause precipitation of the graft polymer containing a cyclic structure.

Curable Composition

The curable composition of the present invention contains the above graft polymer containing a cyclic structure and curing agent as essential ingredients and, if necessary, a curing accelerator, curing aid, and other ingredients.

The curing agent is not particularly limited so long as it is one which cures a graft polymer containing a cyclic structure. For example, an ionic curing agent, radical curing agent, etc. may be used. An ionic curing agent is preferable from the viewpoint of the insulation resistance, heat resistance, surface hardness, and affinity with a graft polymer containing a cyclic structure.

As an ionic curing agent, hexamethylene diamine, triethylene tetramine, diethylene triamine, tetraethylene pentamine, diaminocyclohexane, 3(4),8(9)-bis(aminomethyl)tricyclo[5,2,1,0$^{2,6}$]decane, 1,3-(diaminomethyl)cyclohexane, menthene diamine, isophorone diamine, N-aminoethylpiperadine, and other polyamine compounds; 4,4'-bisazidobenzal(4-methyl)cyclohexanone, 4,4'-diazidocalcone, and other bisazide compounds; phthalic anhydride, pyromellitic anhydride, benzophenone tetracarboxylic anhydride, nadic anhydride, and other acid anhydrides; fumaric acid, phthalic acid, maleic acid, and other polyhydric carboxylic acids; 1,3-butanediol, 1,4-butanediol, 1,1,1-trimethylolpropane, and other polyol compounds; phenol novolak resin, cresol novolak resin, and other polyhydric phenol compounds; nylon-6, nylon-66, polyhexamethylene diamine terephthalamide, and other polyamide compounds; hexamethylene diisocyanate, toluidiene diisocyanate, and other diisocyanate compounds; phenol novolak type epoxy compounds, cresol novolak type epoxy compounds, bisphenol A type epoxy compounds, bisphenol F type epoxy compounds, brominated bisphenol A type epoxy compounds, dicyclopentadiene type epoxy resins, and other polyhydric epoxy compounds, etc. may be mentioned. Among these, from the viewpoint of superiority in low dielectric property, low water absorption, heat resistance, and affinity with a graft polymer containing: a cyclic structure, a polyol compound, polyhydric phenol compound, polyhydric epoxy compound, etc. are preferable. In particular, a polyhydric epoxy compound is preferable.

As a radical curing agent, methylethylketone peroxide, cyclohexanone peroxide, 1,1-bis(t-butylperoxy)3,3,5-tricyclohexane, 2,2-bis(t-butylperoxy)butane, t-butyl hydroperoxide, octanoyl peroxide, isobutyryl peroxide, peroxydicarbonate, and other organic peroxides etc. may be mentioned.

These curing agents may be used alone or as combinations of two or more types. The amount of the curing agent blended is, with respect to 100 parts by weight of the graft polymer containing a cyclic structure, normally 5 to 150 parts by weight, preferably 15 to 120 parts by weight, more preferably 30 to 100 parts by weight.

In the present invention, to further raise the curability of the graft polymer containing a cyclic structure, it is possible to use a curing accelerator or curing aid.

The curing accelerator is not particularly limited. When the curing agent is for example a polyhydric epoxy compound, a tertiary amine-based compound, boron trifluoride complex, etc. is preferable. Among these, if using a tertiary amine-based compound, the laminability with micro-interconnections, insulation resistance, heat resistance, and chemical resistance are improved.

As a specific example of a tertiary amine-based compound, benzyldimethylamine, triethanolamine, triethylamine, and other chain-like tertiary amine compounds; pyrazoles, pyridines, pyradines, pyrimidines, indazoles, quinolines, isoquinolines, imidazoles, triazoles, and other compounds may be mentioned. Among these, imidazoles, in particular substituted imidazole compounds having substituent groups are preferred.

As specific examples of substituted imidazole compounds, 2-ethylimidazole, 2-ethyl-4-methylimidazole, bis-2-ethyl-4-methylimidazole, and other alkyl-substituted imidazole compounds; 2-phenylimidazole, 2-phenyl-4-methylimidazole, 1-benzyl-2-methylimidazole, 2-benzyl-2-phenylimidazole, benzimidazole, and other imidazole compounds substituted by aryl groups or arakyl groups or other hydrocarbon groups having cyclic structures, etc. may be mentioned. Among these, imidazoles having substituent groups containing cyclic structures, in particular 1-benzyl-2-phenylimidazole, are preferable from the viewpoint of affinity with a graft polymer containing a cyclic structure.

These curing accelerators can be used alone or in combinations of two or more types. The amount of the curing accelerator blended is suitably selected in accordance with the objective of use, but is, with respect to 100 parts by weight of the graft polymer containing a cyclic structure, normally 0.001 to 30 parts by weight, preferably 0.01 to 10 parts by weight, more preferably 0.03 to 5 parts by weight.

The curing aid is not particularly limited. Quinone dioxime, benzoquinone dioxime, p-nitrosophenol, and other oxime-nitroso-based curing agents; N,N-m-phenylene bismaleimide and other maleimide-based curing aids; diallyl phthalate, triallyl cyanulate, triallyl isocyanulate, and other allyl-based curing agents; ethyleneglycol dimethacrylate, trimethylolpropane trimethacrylate, and other methacrylate-based curing aids; vinyltoluene, ethylvinylbenzene, divinylbenzene, and other vinyl-based curing aids etc. may be mentioned.

These curing aids may be used alone or in combinations of two or more types. The amount blended is, with respect to 100 parts by weight of the curing agent, normally 1 to 1000 parts by weight, preferably 10 to 500 parts by weight.

The curable composition of the present invention may further have blended into it other ingredients as desired in addition to the above graft polymer containing a cyclic structure and curing agent (including curing accelerator and curing aid). As the other ingredients, for example, other polymers or other compounding agents etc. may be mentioned.

As the other polymer, for example, natural rubber, polybutadiene rubber, polyisoprene rubber, acrylonitrile-butadiene copolymer rubber, hydrogenated acrylonitrile-butadiene copolymer rubber, ethylene-propylene-styrene block copolymer rubber, urethane-based thermoplastic elastomers, and other rubbery polymers or low density polyethylene, high density polyethylene, polypropylene, nylon 66, ethylene-vinyl acetate copolymer, polyester, polycarbonate, and other polymers not having cyclic structures, that is, resins, may be mentioned.

These other polymers may be used alone or in combinations of two or more types. The amount of the other polymers blended is, with respect to 100 parts by weight of the graft polymer containing a cyclic structure, normally not more than 100 parts by weight, preferably not more than 70 parts by weight, more preferably not more than 50 parts by weight. The lower limit is 0 part by weight.

As other compounding agents, for example, thiol compounds and other bondability improving agents, fillers, flame retardants, heat resistance stabilizers, weather resistance stabilizers, leveling agents, anti-static agents, slip agents, antiblocking agents, anti-fogging agents, lubricants, dyes, pigments, natural oils, synthetic oils, varnishes, emulsifiers, etc. may be mentioned. These compounding agents are suitably selected in a range not impairing the object of the present invention.

A typical form of the curable composition of the present invention is a varnish comprised of the curable composition dissolved in an organic solvent.

As specific examples of organic solvents used in preparation of a varnish, as nonpolar solvents, toluene, xylene, ethylbenzene, trimethylbenzene, and other aromatic hydrocarbons; n-pentane, n-hexane, n-heptane, and other aliphatic hydrocarbons; cyclopentane, cyclohexane, and other alicyclic hydrocarbons; etc. may be mentioned. As polar solvents, chlorobenzene, dichlorobenzene, trichlorobenzene, and other halogenated hydrocarbons; methylethylketone, methylisobutylketone, cyclopentanone, cyclohexanone, acetophenone, and other ketone-based solvents; cyclohexyl acetate, methyl benzoate, ethyl benzoate, γ-butyl lactone, propyleneglycol methylether acetate, ethyleneglycol methylether acetate, and other ester-based solvents; tetrahydrofuran, tetrahydropyrane, anisole, and other ether-based solvents; ethylene carbonate, propylene carbonate, and other carbonate-based solvents; dimethyl formamide, dimethyl acetoamide, N-methylpyrrolidone, and other amide-bsaed solvents may be mentioned.

These solvents may be used alone or in combinations of two or more types. Among these solvents, a mixed solvent of a nonpolar solvent such as aromatic hydrocarbon-based solvent or alicyclic hydrocarbon-based solvent and a polar solvent such as a ketone-based solvent is preferable as the solution comprising the dissolved graft polymer containing a cyclic structure of the present invention, curing agent, etc. is superior in ability to bury micro-interconnections and will not cause bubbles etc. The ratio of mixing of these nonpolar organic solvents and polar organic solvents may be suitably selected, but by weight ratio is normally 5:95 to 95:5, preferably 10:90 to 90:10, more preferably 20:80 to 80:20.

The amount of the organic solvent used is suitably selected in accordance with the objective of use, but the solid content concentration is normally 5 to 80 wt %, preferably 10 to 70 wt %, more preferably 20 to 60 wt %.

The method of dispersion or dissolution of the ingredients of the curable composition in the organic solvent may be an ordinary method. For example, it may be performed by stirring using a stirrer and magnetic stirrer, a method using a high speed homogenizer, disperser, planetary stirring machine, twin-screw stirring machine, ball mill, triple roll, etc.

Shaped Article

As the shaped article obtained using the curable composition of the present invention, a film or sheet can be preferably formed by using an ordinary solution casting method to for example coat the above varnish on a support, then dry off the solvent. As the coating method, any method such as dip coating, roll coating, curtain coating, die coating, and slit coating can be used. The conditions for removing the solvent and drying are suitably selected according to the type of the solvent. The drying temperature is usually 20 to 300° C., preferably 30 to 200° C., while the drying time is usually 30 seconds to 1 hour, preferably 1 minute to 30 minutes.

The thickness of the film or sheet is normally 0.1 to 150 μm, preferably 0.5 to 100 μm, more preferably 1.0 to 80 μm.

As the support, a resin film, metal foil, etc. may be mentioned. As a resin film, normally a thermoplastic resin film is used. Specifically, a polyester film, polypropylene film, polyethylene film, polycarbonate film, polyethylene naphthalate film, polyarylate film, nylon film, etc. may be mentioned. Among these resin films, a polyethylene terephthalate film, polyethylene naphthalate film, or other polyester film is preferable from the viewpoint of the heat resistance, chemical resistance, peelability after lamination, etc. As the metal foil, for example a copper foil, aluminum foil, nickel foil, chrome foil, gold foil, silver foil, etc. may be mentioned. The thickness of the support is not particularly limited, but from the viewpoint of work efficiency etc., normally is 1 μm to 150 μm, preferably 2 μm to 100 μm, more preferably 3 to 50 μm.

The relative dielectric constant (∈) of the shaped article obtained using the curable composition of the present invention is suitably selected according to the objective of use, but in terms of value measured at 1 MHz according to JIS C 6481 is normally not more than 4, preferably not more than 3, more preferably not more than 2.85, most preferably not more than 2.7.

The water absorption of the shaped article obtained using the curable composition of the present invention is suitably selected in accordance with the objective of use, but in terms of value measured in accordance with JIS C 6481 is normally not more than 0.5%, preferably not more than 0.2%, more preferably not more than 0.15%, most preferably not more than 0.1%.

Applications

The curable composition of the present invention is, as a varnish, superior in filterability, superior in smoothness, flatness, buriability, surface hardness, etc., and further superior in low dielectric property, low water absorption, and heat resistance, so is suitable for various organic materials for electronic parts and can be used in the form of a varnish, film, or sheet for example for an insulating material for a printed writing board, an insulating material film between layers for buildup multilayer boards, an insulating material film of a flexible printed writing board, an interlayer insulating material film for LSI's, VLSI's, and other semiconductor devices, and other insulating materials; a cover coating material for a semiconductor device, a protective coating material, a solder resist material for a printed writing board, etc. Further, the curable composition of the present invention is superior in transparency as well, so can be used for the material of a color filter for a liquid crystal display substrate, a flattening film for a TFT array, a flattening film for various interconnections, cells for liquid crystal displays (also called "polymer cells"), etc.

Next, the present invention will be explained more specifically by giving examples and comparative examples. In these examples, "parts" and "%" are based on weight unless otherwise indicated.

The following methods were used for the various tests and evaluation:

(1) Molecular Weight

The weight average molecular weight (Mw) and number average molecular weight (Mn) of a sample polymer were measured as standard polystyrene converted values by GPC using THF as a development solution by charging a 1 μl sample of a 0.5% THF solution in columns made by Toso (TSKgel G4000, TSKgel G5000 connected in series).

(2) Gel Content

A 10% THF solution of the sample polymer was filtered by a Teflon filter having a pore size of 0.22 μm, then the undissolved polymer remaining on the filter was recovered, vacuum dried at a temperature of 120° C. for 12 hours, and measured for weight to find the ratio with the weight of the sample polymer before filtration (%)

(3) Hydrogenation Rate and Graft Ratio

The hydrogenation rate of the main chain of the polymer containing a cyclic structure (norbornene-based ring-opening polymer) and the graft ratio of the polymer containing a cyclic structure were measured by $^1$H-NMR.

(4) Filterability 10 g of the sample polymer was used to obtain a 10% THF solution which was then filtered using a filter having a pore size of 0.22 µm and an area of 20 cm$^2$ at a pressure of 2 kg/cm$^2$. The time (Tf) required for filtering the entire amount was measured and evaluated by the following criteria:

VG (Very Good): TF$\leqq$60 seconds
G (Good): 60 seconds<Tf$\leqq$120 sections
F (Fair): 120 seconds<Tf$\leqq$180 seconds
P (Poor): 180 seconds<Tf (5) Smoothness The sample polymer was dissolved in the formulation shown in the examples to obtain a 30% trimethylbenzene/cyclohexane (70%/30%) solution which was then spin coated on a silicon substrate under conditions of a speed of 1000 rpm for 30 seconds. The substrate was prebaked at 80° C. for 10 minutes, then hard baked at 230° C. for 1 hour. The evenness of the surface at this time was observed under an electron microscope and evaluated by the following criteria:

VG: No undulation at all
G: Slight undulation at end surface of substrate
F: Slight undulation on entire surface of substrate
P: Locations with large undulation (6) Flatness A solution prepared in the same way as in the above (5) was coated on a silicon oxide film substrate having step differences of a line width of 10 µm and height of 1.0 µm, then prebaked and hard baked to form a coating film over the step differences. The maximum step difference of the coating film was measured using a contact-type film thickness measuring device, then the flatness (d) of the following formula was calculated and evaluated by the following criteria:

$d$=Maximum step difference÷Initial step difference (1.0 µm)×100(%)

G: d$\leqq$5%
F: 5%<ds$\leqq$10%
P: 10%<d (7) Low Dielectric Property

The dielectric constant ($\in$) was measured in accordance with JIS C 6481 and evaluated by the following criteria:

VG: $\in\leqq$2.70
G: 2.70<$\in\leqq$2.85
F: 2.85<$\in\leqq$3.00
P: 3.00<$\in$ (8) Low Water Absorption The water absorption rate (w) was measured in accordance with JIS C 6481 and evaluated by the following criteria:

VG: w$\leqq$0.10%
G: 0.10%<w$\leqq$0.15%
F: 0.15%<w$\leqq$0.20%
P: 0.20<w (9) Surface Hardness The curable composition was coated on a glass sheet, then cured at 230° C. for 1 hour to obtain a coating film of a thickness of 1 µm. This was pressed by a trigonal pyramid indenter (115°) at a load speed of 0.0145 gf/S using a dynamic ultrafine hardness meter (DUH-201, made by Shimadzu Corporation). The pressed depth (h) giving a load of 0.5 mN(P) was measured. The DHT115 of the following formula was calculated from the results and evaluated by the following criteria:

$DHT115 = 3.838 \, P/h^2$

VG: DHT115$\geqq$55
G: 55>DHT115$\geqq$50
F: 50>DUH115$\geqq$45
P: 45>DUH115

(10) Heat Resistance

The curable composition was coated on a glass sheet, then cured at 230° C. for 1 hour to obtain a 2 µm coating film. Indium tin oxide (ITO) was vapor deposited over this, then the appearance of the ITO film was observed and evaluated by the following criteria. Note that the conditions for forming the ITO film were an electrodischarge voltage of 60V, a film thickness of 1000 Å, and a glass sheet temperature of 220 to 240° C.

VG: No wrinkling in appearance
G: Slight wrinkling at one end of glass sheet
F: Wrinkling at four ends of glass sheet
P: Wrinkling over entire surface

(11) Molecular Weight/Area Ratio

Ratio of high molecular weight side area Ha and low molecular weight side area La divided by a vertical line suspended from a peak top of a differentiated elution profile measured by GPC in the above (1) to a baseline for the graft polymer containing a cyclic structure.

(12) Interconnection Buriability

The curable composition was dissolved in a 1,2,4-trimethylbenzene/cyclohexanone/tertiary butyl acetate (weight ratio 6/3.5/0.5) solution to a solid content concentration of 30 wt %. This solution was coated on a Teflon plate of a thickness of 3 mm by the doctor blade method, then dried at a temperature of 120° C. for 5 minutes to obtain a semicured film of a thickness of 50 µm. The obtained film was pressed on an FR-4 grid board having copper interconnections of a step difference of 35 µm and line width of 50 µm arranged at line intervals of 50 µm under vacuum at a temperature of 200° C. for 1 hour. The obtained grid board was cut in a direction perpendicular to the interconnections and the cross-section was observed under an electron microscope and evaluated by the following criteria.

VG: Completely buried, resin surface smooth
G: Completely buried, but slight undulation at surface
F: Burying insufficient, slight voids
P: Burying insufficient, numerous voids

EXAMPLE 1

Preparation of Graft Polymer A Containing a Cyclic Structure

Using a polymerization catalyst comprised of tungsten hexachloride, triisobutyl aluminum, and isobutyl alcohol, 8-ethyltetracyclo[4,4,0,1$^{2,5}$,1$^{7,10}$]-dod eca-3-ene (hereinafter referred to as "ETD") was polymerized by a known method, then hydrogenated using a hydrogenation catalyst comprised of nickel acetyl acetate and triisobutyl aluminum to obtain a hydrogenated norbornene-based ring-opening polymer (hereinafter referred to as the "polymer A") (hydrogenation rate: at least 99%). Next, 100 parts of the polymer A, 200 parts of maleic anhydride, 150 parts of t-butyl benzene, and 150 parts of ethyl benzoate were mixed in an autoclave. After these were completely dissolved, the atmosphere was replaced with nitrogen, then the temperature raised to 135° C. 20 parts of dicumyl peroxide were divided into 10 sections in the autoclave and the sections added at 12 minute intervals over 2 hours, then the mixture was allowed to react for 3 hours. The dicumyl peroxide remaining in the reaction solution (undissolved part) was assayed by gas chromatography, whereupon it was confirmed to be not more than 2%. The reaction solution was added drop-wise into isopropanol and solidified and dried to obtain the graft polymer containing a cyclic structure A. The properties of the graft polymer A containing a cyclic structure are shown in Table 1.

EXAMPLE 2

Preparation of Graft Polymer B Containing a Cyclic Structure

The same procedure was performed as in Example 1 except for changing the amount of the dicumyl peroxide to 15 parts and the amount of the maleic anhydride to 150 parts to obtain the graft polymer B containing a cyclic structure. The properties of the graft polymer B containing a cyclic structure are shown in Table 1.

EXAMPLE 3

Preparation of Graft Polymer C Containing a Cyclic Structure

The same procedure was performed as in Example 1 except for changing the amount of the dicumyl peroxide to 10 parts and the amount of the maleic anhydride to 100 parts to obtain the graft polymer C containing a cyclic structure. The properties of the graft polymer C containing a cyclic structure are shown in Table 1.

EXAMPLE 4

Preparation of Graft Polymer D Containing a Cyclic Structure

The same procedure was performed as in Example 1 except for changing the amount of the dicumyl peroxide to 7 parts and the amount of the maleic anhydride to 70 parts and changing the methyl benzoate to anisole to obtain the graft polymer D containing a cyclic structure. The properties of the graft polymer D containing a cyclic structure are shown in Table 1.

EXAMPLE 5

Preparation of Graft Polymer E Containing a Cyclic Structure

The same procedure was performed as in Example 1 except for changing the amount of the dicumyl peroxide to 7 parts, the amount of the maleic anhydride to 70 parts, and the amount of the tertiary butyl benzene to 200 parts and changing the 150 parts of ethyl benzoate to 100 parts of anisole to obtain the graft polymer E containing a cyclic structure. The properties of the graft polymer E containing a cyclic structure are shown in Table 1.

EXAMPLE 6

Preparation of Graft Polymer F Containing a Cyclic Structure

The same procedure was performed as in Example 1 except for changing the amount of the dicumyl peroxide to 7 parts, the amount of the maleic anhydride to 70 parts, and the amount of the tertiary butyl benzene to 250 parts and changing the 150 parts of ethyl benzoate to 50 parts of anisole to obtain the graft polymer F containing a cyclic structure. The properties of the graft polymer F containing a cyclic structure are shown in Table 1.

EXAMPLE 7

Preparation of Graft Polymer G Containing a Cyclic Structure

The same procedure was performed as in Example 1 except for changing the amount of the dicumyl peroxide to 5 parts and the amount of the maleic anhydride to 50 parts and changing the ethyl benzoate to anisole to obtain the graft polymer G containing a cyclic structure. The properties of the graft polymer G containing a cyclic structure are shown in Table 1.

COMPARATIVE EXAMPLE 1

Preparation of Graft Polymer H Containing a Cyclic Structure

The same procedure was performed as in Example 1 except for changing the amount of the dicumyl peroxide to 3.5 parts, the amount of the maleic anhydride to 35 parts, and the amount of the tertiary butyl benzene to 300 parts and not using ethyl benzoate to obtain the graft polymer H containing a cyclic structure. The properties of the graft polymer H containing a cyclic structure are shown in Table 1.

COMPARATIVE EXAMPLE 2

Preparation of Graft Polymer I Containing a Cyclic Structure

The same procedure was performed as in Example 1 except for changing the amount of the dicumyl peroxide to 5.0 parts, the amount of the maleic anhydride to 50 parts, and the amount of the tertiary butyl benzene to 300 parts and not using ethyl benzoate to obtain the graft polymer I containing a cyclic structure. The properties of the graft polymer I containing a cyclic structure are shown in Table 1. Further, the graft polymer I containing a cyclic structure was dissolved in THF to obtain a 10 wt % solution which was then attempted to be filtered using a filter having a pore size of 0.22 μm and area of 20 cm$^2$ at a pressure of 2 kg/cm$^2$.

TABLE 1

| No. | Graft polymer containing cyclic structure | Graft ratio (mol %) | Weight average molecular weight (×10$^4$) | Gel content (wt %) | Molecular weight area ratio Ha/La |
|---|---|---|---|---|---|
| Example 1 | A | 97 | 4.53 | 0.008 | 1.30 |
| Example 2 | B | 78 | 4.22 | 0.006 | 1.25 |
| Example 3 | C | 60 | 4.34 | 0.007 | 1.23 |
| Example 4 | D | 45 | 4.20 | 0.004 | 1.16 |
| Example 5 | E | 45 | 4.61 | 0.03 | 1.23 |
| Example 6 | F | 45 | 4.78 | 0.08 | 1.34 |
| Example 7 | G | 35 | 4.44 | 0.002 | 1.16 |
| Comp. Ex. 1 | H | 25 | 5.95 | 0.26 | 1.87 |
| Comp. Ex. 2 | I | 35 | 6.89 | Large | 1.91 |

As shown in Table 1, by using jointly a nonpolar organic solvent and a polar organic solvent as the reaction solvent, a high modification of a graft ratio of at least 35 mol % is performed and the obtained graft polymer containing a cyclic structure has a weight average molecular weight of 1,000 to 1,000,000, a gel content of not more than 0.1%, a low amount, or an Ha/La of not more than 1.6 (Examples 1 to 7). Comparative Examples 1 and 2 using only a nonpolar organic solvent as the reaction solvent had remarkably increased gel contents and remarkably increased Ha/La ratios.

EXAMPLES 8 TO 14 AND COMPARATIVE EXAMPLES 3 AND 4

Films obtained by preparing, casting, and drying a curable composition by mixing the graft polymer containing a cyclic structure obtained in Examples 1 to 7 and Comparative Examples 1 and 2, a polyhydric epoxy compound, a dicyclopentadiene-type epoxy resin (made by Nippon Kayaku, XD-1000-2L), and 1-benzyl-2-phenylimidazole in the parts of formulation shown in Table 2 were evaluated for filterability, smoothness, flatness, low dielectric property, low water absorption, and heat resistance. The results are shown in Table 2. In the table, a dicyclopentadiene-type epoxy resin is indicated by "XD" and 1-benzyl-2-phenylimidazole is indicated by "BPZ".

TABLE 2

| No. | Graft polymer containing a cyclic structure (parts by weight) | Curing agent (parts by weight) | Curing accelerator (parts by weight) | Filterability | Smoothness | Flatness | Low dielectric property | Low water absorption | Surface hardness | Heat resistance | Interconnection buriability |
|---|---|---|---|---|---|---|---|---|---|---|---|
| Ex. 8 | A (100) | XD (40) | BPZ (0.5) | VG | VG | VG | VG | VG | VG | VG | VG |
| Ex. 9 | B (100) | XD (40) | BPZ (0.5) | VG | VG | VG | VG | VG | VG | VG | VG |
| Ex. 10 | C (100) | XD (40) | BPZ (0.5) | VG | VG | VG | VG | VG | VG | VG | VG |
| Ex. 11 | D (100) | XD (40) | BPZ (0.5) | VG | VG | VG | VG | VG | VG | VG | VG |
| Ex. 12 | E (100) | XD (40) | BPZ (0.5) | VG | G | G | VG | VG | VG | VG | VG |
| Ex. 13 | F (100) | XD (40) | BPZ (0.5) | VG | F | F | VG | VG | VG | VG | VG |
| Ex. 14 | G (100) | XD (40) | BPZ (0.5) | VG | VG | VG | VG | VG | G | G | VG |
| Comp. Ex. 3 | H (100) | XD (40) | BPZ (0.5) | F | P | P | VG | VG | P | P | P |
| Comp. Ex. 4 | I (100) | XD (40) | BPZ (0.5) | P | P | P | VG | VG | G | G | P |

As shown in Table 2, each of the curable compositions of the present invention is superior in all evaluation items (Examples 8 to 14).

However, Comparative Example 3 and Comparative Example 4 using graft polymers containing cyclic structures with low graft ratios and large gel contents failed to give superior results in items other than low dielectric property and low water absorption.

The invention claimed is:

1. A graft polymer containing a cyclic structure comprised of a polymer having cycloalkane structure or repeating units of aromatic rings in its main chain, graft-modified with an unsaturated compound containing a hetero atom or a group having a hetero atom, having a graft ratio of 10 mol % to 150 mol %, having a ratio (Ha/La) of high molecular weight side area (Ha) and low molecular weight side area (La) divided by a vertical line suspended from the peak top of a differentiated elution profile measured by gel permeation chromatography to the baseline of not more than 1.6, and having a weight average molecular weight of 1,000 to 1,000,000.

2. The graft polymer as set forth in claim 1, having a gel content of not more than 0.1 wt %.

3. The graft polymer containing a cyclic structure as set forth in claim 2 or 1, wherein the polymer containing a cyclic structure is a norbornene-based-polymer or its hydride.

4. The graft polymer containing a cyclic structure as set forth in claim 2 or 1, wherein the unsaturated compound is an unsaturated carboxylic anhydride compound.

5. The graft polymer containing a cyclic structure as set forth in claim 2 or 1, wherein the graft ratio is 30 mol % to 120 mol %.

6. The graft polymer containing a cyclic structure as set forth in claim 2 or 1, wherein the weight average molecular weight is 5,000 to 500,000.

7. The graft polymer containing a cyclic structure as set forth in claim 2, wherein the gel content is not more than 0.05 wt %.

8. The graft polymer containing a cyclic structure as set forth in claim 1, wherein the ratio (Ha/La) is not more than 1.4.

9. A curable composition containing a graft polymer having cycloalkane structure or repeating units of aromatic rings in its main chain, and a curing agent, wherein said graft polymer is comprised of a polymer containing a cyclic structure graft-modified with an unsaturated compound containing a hetero atom or a group having a hetero atom, having a graft ratio of 10 mol % to 150 mol %, having a ratio (Ha/La) of high molecular weight side area (Ha) and low molecular weight side area (La) divided by a vertical line suspended from the peak top of a differentiated elution profile measured by gel permeation chromatography to the baseline of not more than 1.6, and having a weight average molecular weight of 1,000 to 1,000,000.

10. The curable composition as set forth in claim 9, wherein said graft polymer has a gel content of not more than 0.1 wt %.

* * * * *